United States Patent
Komatsu

(10) Patent No.: US 6,181,732 B1
(45) Date of Patent: Jan. 30, 2001

(54) RECEIVING APPARATUS FOR SPECTRUM SPREADING AND RECEIVING METHOD

(75) Inventor: Masahiro Komatsu, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/069,418

(22) Filed: Apr. 29, 1998

(30) Foreign Application Priority Data

Feb. 5, 1997 (JP) .................................................. 9-114754

(51) Int. Cl.$^7$ .................................................. H04L 27/30
(52) U.S. Cl. ........................... 375/150; 375/149; 375/147
(58) Field of Search ..................... 375/150, 142, 375/145, 149, 147, 130, 367; 370/342, 335, 350, 441

(56) References Cited

U.S. PATENT DOCUMENTS

| | | | |
|---|---|---|---|
| 5,809,064 | * 9/1998 | Fenton et al. | 375/208 |
| 5,850,414 | * 12/1998 | Miyajima | 375/206 |
| 6,064,688 | * 5/2000 | Yanagi | 375/149 |

* cited by examiner

Primary Examiner—Chi H. Pham
Assistant Examiner—Khai Tran
(74) Attorney, Agent, or Firm—Ostrolenk, Faber, Gerb & Soffen, LLP

(57) ABSTRACT

A spectrum-spread signal is taken out by a mixer 11, a low pass filter 2 and a sample hold circuit 3, codes for one period of spreading codes on a transmitting side of the spectrum-spread signal is multiplied by codes for one period of previously given spreading codes on a receiving side and the summations of the multiplication are output by means of a matched filter in a correlator 4, and a symbolic integration section 6 inversely modulates known symbols of a symbol signal inversely spread at one chip interval using theoretical values, and performs symbolic integration, and in a pseudo correlation removing section 7, pseudo correlation is removed by subtracting the theoretical values of the correlation values in order of magnitude of an amplitude and in a synchronization detecting section 5, timing when the amplitude becomes to be maximum is detected as receiving timing.

8 Claims, 7 Drawing Sheets

RECEIVING APPARATUS FOR SPECTRUM SPREADING AND RECEIVING METHOD

BACKGROUND OF THE INVENTION

The present invention relates to a receiving technique for spectrum spreading communication in which a spectrum-spread signal by direct spreading is received.

A direct spreading-spectrum spreading communication system using a spectrum spreading (SS) by means of direct spreading (DS) has a feature that interference is difficult to occur and communication capacity is large and so forth, and the system has been studied and developed as a communication system for communication and so forth of an automobile telephone.

Referring to FIG. 8, the direct spreading-spectrum spreading communication system will be explained. This direct spreading-spectrum spreading communication system is substantially the same as a disclosure as a prior art in JP-A-90222/1994, and has a transmitting device A for spectrum spreading communication and a receiving device B for spectrum spreading communication.

The transmitting device A for spectrum spreading communication has a spreading code generator 4' for generating a spreading code such as a pseudo noise signal (PN code) as a spreading code on a transmitting side. A spectrum spreading section 2' applies spectrum-spreading by means of direct spreading to an information signal using this spreading code on the transmitting side, and outputs a spectrum-spread signal. The spectrum spreading section 2' is a multiplier for multiplying the spreading signal by the information signal. A modulating section 3' phase-modulates a carrier having a predetermined carrier frequency with the spectrum-spread signal (base band signal), and outputs a phase-modulated carrier. An antenna 5' transmits the phase-modulated carrier as a radio signal. In this manner, the radio signal carries the spectrum-spread signal as the base band signal.

The receiving device B for spectrum spreading communication has an antenna 6' for receiving the radio signal as a receiving signal. A synchronizing circuit 7' has a spreading code same as the spreading code on the transmitting side which is generated by the spreading code generator 4' of the transmitting device A for spectrum spreading communication, as a spreading code on a receiving side, synchronizes the spreading code on the receiving side with the spreading code of the transmitting side of the receiving signal, and outputs a synchronized spreading code to a spectrum inverse spreading section 8'. This spectrum inverse spreading section 8' applies spectrum-inverse-spreading to the receiving signal with the synchronized spreading code, and outputs a spectrum-inverse-spread signal. This spectrum inverse spreading section 8' is a multiplier for multiplying the receiving signal by the spreading code. A demodulating section 9' demodulates the above-mentioned information signal from the spectrum-inverse-spread signal.

Here, in order to establish the synchronization in the synchronizing circuit 7', a point is searched where phases in the receiving signal of the spreading code on the receiving side to the spreading code on the transmitting side coincide with each other, and timing thereof has to be controlled within a predetermined range.

Referring to FIG. 9, a conventional synchronizing circuit is shown, which is used as the synchronizing circuit 7' in FIG. 8. The synchronizing circuit shown in the figure includes a frequency converter that has a local oscillator 1 for outputting a local oscillating signal having a predetermined oscillating frequency and a mixer 11 for mixing a receiving signal with the local oscillating signal and outputting a mixed signal. At this time, the mixer 11 outputs the above-described mixed signal having a frequency that is equal to the difference between the predetermined local oscillating frequency and a carrier frequency of the receiving signal. Since the predetermined local oscillating frequency is previously selected so that the difference between this predetermined local oscillating frequency and the carrier frequency is equal to a frequency of a base band signal (spectrum-spread signal), the mixer 11 outputs the above-described mixed signal having a frequency that is equal to the frequency of the base band signal (spectrum-spread signal).

An LPF (Low Pass Filter) 2 outputs the base band signal (spectrum-spread signal) from this mixed signal. A sample hole circuit 3 sample-holes the spectrum-spread signal and sends a correlator 4 the spectrum-spread signal that is under sample-held condition.

The correlator 4 is constructed of a matched filter and multiplies codes for one period of spreading codes on a transmitting side of a spectrum-spread signal by codes for one period of the previously given and above-mentioned spreading codes on a receiving side, and outputs the summation of results of the multiplication. This summation becomes to be maximum in case that timing of the spreading code on the transmitting side of the spectrum-spread signal and timing of the spreading codes on the receiving side coincide with each other. In this manner, the correlator 4 performs the above-described multiplication chip by chip corresponding to the spreading codes on the receiving side for one period, and outputs the summation of the results of the multiplication chip by chip.

A synchronization detecting circuit 5 detects a matched pulse indicating that the above-described summation is maximum, and outputs the above-described spreading codes on the receiving side at time when detecting the matched pulse, as synchronized spreading codes, to the spectrum inverse spreading section 81.

Referring to FIG. 10, the correlator 4 in FIG. 9 is shown. The correlator 4 shown in the figure is constructed of a matched filter, and has a shift register capable of storing codes for one chip of the spectrum-spread signal obtained as a base band signal. A coefficient generator 4b generates codes for one chip of the spreading codes on the receiving side. A multiplier 4d multiplies codes for one chip stored in the shift register 4a by the codes for one chip of the spreading codes on the receiving side, and outputs results of the multiplication. An adder 4c outputs the summation of the results of the multiplication. This summation becomes to be maximum in case that timing of the spreading codes on the receiving side from the coefficient generator 4b and timing of the spreading code on the transmitting side of the spectrum-spread signal coincide with each other. At this time, the adder 4c outputs the above-mentioned matched pulse indicating that the above-described summation is maximum.

However, in a method for synchronization using the synchronization circuit in FIG. 9, since correlation of phase shifts of the spreading codes is not zero, a pseudo peak occurs at timing other than a peak of proper correlation. Accordingly, in case of combining a plurality of paths with different timings by means of a RAKE combination, since it is impossible to discriminate between a peak due to multi-paths and a pseudo peak occurring due to the non-zero correlation, there has been a task that characteristic after the RAKE combination deteriorates.

SUMMARY OF THE INVENTION

The objective of the present invention is to solve the above-described task.

Also, the objective of the present invention is to provide a receiving technique in a spectrum spreading communication system, which is capable of certainly establishing synchronization and improving accuracy of detecting synchronization timing even in case that correlation of phase shifts of the spreading codes is not zero.

The objective of the above-described present invention is achieved by a receiving apparatus for spectrum spreading communication for receiving a spectrum-spread signal as a receiving signal, which is created by applying spectrum-spreading with spreading codes on a transmitting side by means of direct spreading to an information signal including a known transmitting symbol sequence, the apparatus including:

a synchronizing circuit for synchronizing spreading codes on a receiving side same as the spreading codes on the transmitting side with the spreading codes on the transmitting side of the receiving signal to be synchronized spreading codes;

a spectrum inverse spreading section for applying spectrum-inverse-spreading to the receiving signal with the synchronized spreading codes and outputting a spectrum-inverse-spread signal; and a demodulating section for demodulating the information signal from the spectrum-inverse-spread signal, the synchronizing circuit having:

a correlator for correlating the receiving signal with the spreading codes on the receiving side and outputting correlation values of a receiving symbol sequence;

a symbolic integration section for inversely modulating correlation values of the receiving symbol sequence with theoretical values of the known transmitting symbol sequence, performing symbolic integration for a predetermined number of symbols, and outputting symbolically integrated correlation values;

a pseudo correlation removing section in which symbolically integrated theoretical correlation values are previously obtained by taking account of the known transmitting symbol sequence and the spreading codes on the transmitting side, for removing pseudo correlation values from the symbolically integrated correlation values by subtracting parts from which a maximum amplitude part of the symbolically integrated theoretical correlation values is removed, from the symbolically integrated correlation values; and a synchronization detecting section for detecting a maximum part of an amplitude of an output signal output from the pseudo correlation removing section, and at time when detecting the maximum part, sending the spectrum inverse spreading section the spreading codes on the receiving side as the synchronized spreading codes.

Also, the objective of the above-described present invention is achieved by a receiving apparatus for spectrum spreading communication for receiving a spectrum-spread signal as a receiving signal, which is created by applying spectrum-spreading with spreading codes on a transmitting side by means of direct spreading to an information signal including a known transmitting symbol sequence consisting of a known N (N being an integer equal to or more than two) number of transmitting symbols, the apparatus including:

a synchronizing circuit for synchronizing spreading codes on a receiving side same as the spreading codes on the transmitting side with the spreading codes on the transmitting side of the receiving signal to be synchronized spreading codes;

a spectrum inverse spreading section for applying spectrum-inverse-spreading to the receiving signal with the synchronized spreading codes and outputting a spectrum-inverse-spread signal; and a demodulating section for demodulating the information signal from the spectrum-inverse-spread signal, the synchronizing circuit having:

a correlator for correlating the receiving signal with the spreading codes on the receiving side and outputting correlation values of an N number of receiving symbols of a receiving symbol sequence;

a symbolic integration section for symbolically integrating the correlation values of the receiving symbols of the receiving symbol sequence for a predetermined number of symbols, and outputting symbolically integrated correlation values;

a pseudo correlation removing section in which, in case of using the known transmitting symbol sequence and the spreading codes on the transmitting side, symbolically integrated theoretical correlation values output from the symbolic integration section are previously obtained, for removing pseudo correlation values from the symbolically integrated correlation values by subtracting parts from which a maximum amplitude part of the symbolically integrated theoretical correlation values is removed, from the symbolically integrated correlation values; and a synchronization detecting section for detecting a maximum part of an amplitude of an output signal output from the pseudo correlation removing section, and at time when detecting the maximum part, sending the spectrum inverse spreading section the spreading codes on the receiving side as the synchronized spreading codes.

In addition, the above-described symbolic integration section can be constructed so that it has theoretical correlation values of the receiving symbols of the receiving symbol sequence which are obtained by the correlator when receiving the known transmitting symbol sequence as the receiving symbol sequence, and inversely modulates correlation values of the receiving symbols of the receiving symbol sequence with the theoretical correlation values, symbolically integrates inversely modulated correlation values for a predetermined number of symbols, and outputs symbolically integrated correlation values.

Also, the objective of the above-described present invention is achieved by a receiving apparatus for spectrum spreading communication for receiving a spectrum-spread signal as a receiving signal, which is created by applying spectrum-spreading with spreading codes on a transmitting side by means of direct spreading to an information signal including a known transmitting symbol sequence, the apparatus including:

a synchronizing circuit for synchronizing spreading codes on a receiving side same as the spreading codes on the transmitting side with the spreading codes on the transmitting side of the receiving signal to be synchronized spreading codes;

a spectrum inverse spreading section for applying spectrum-inverse-spreading to the receiving signal with the synchronized spreading codes and outputting a spectrum-inverse-spread signal; and a demodulating section for demodulating the information signal from the spectrum-inverse-spread signal, the synchronizing circuit having:

a symbolic integration section for inversely modulating the receiving signal with theoretical values of the known transmitting symbol sequence, and performing symbolic integration for a predetermined number of symbols;

a correlator for correlating an output signal from the symbolic integration section with the spreading codes on the receiving side and outputting correlation values; and a synchronization detecting section in which theoretical correlation values are previously obtained by taking account of the known transmitting symbol sequence and the spreading codes on the transmitting side, for detecting synchronization timing from correlation values output from the correlator and the theoretical correlation values, and at time when detecting the synchronization timing, sending the spectrum inverse spreading section the spreading codes on the receiving side as the synchronized spreading codes.

Moreover, the objective of the above-described present invention is achieved by a receiving method in a spectrum spreading communication system for receiving a spectrum-spread signal as a receiving signal, which is created by applying spectrum-spreading with spreading codes on a transmitting side by means of direct spreading to an information signal including a known transmitting symbol sequence, the method including steps of:

previously obtaining and storing symbolically integrated theoretical correlation values by taking account of the known transmitting symbol sequence and the spreading codes on the transmitting side;

correlating the receiving signal with spreading codes on a receiving side, and obtaining correlation values of a receiving symbol sequence;

inversely modulating correlation values of the receiving symbol sequence with theoretical values of the known transmitting symbol sequence, performing symbolic integration for a predetermined number of symbols, and obtaining symbolically integrated correlation values;

removing pseudo correlation values from the symbolically integrated correlation values by subtracting parts from which a maximum amplitude part of the symbolically integrated theoretical correlation values is removed, from the symbolically integrated correlation values; and detecting a maximum part of an amplitude of correlation from which the pseudo correlation values are removed, and at time when detecting the maximum part, sending the spreading codes on the receiving side as synchronized spreading codes.

Furthermore, the objective of the above-described present invention is achieved by a receiving method in a spectrum spreading communication system for receiving a spectrum-spread signal as a receiving signal, which is created by applying spectrum-spreading with spreading codes on a transmitting side by means of direct spreading to an information signal including a known transmitting symbol sequence consisting of a known N (N being an integer equal to or more than two) number of transmitting symbols, the method including steps of:

previously obtaining and storing symbolically integrated theoretical correlation values in case of using the known transmitting symbol sequence and the spreading codes on the transmitting side;

correlating the receiving signal with spreading codes on a receiving side, and obtaining correlation values of an N number of receiving symbols of a receiving symbol sequence;

symbolically integrating the correlation values of the receiving symbols of the receiving symbol sequence for a predetermined number of symbols, and obtaining symbolically integrated correlation values;

removing pseudo correlation values from the symbolically integrated correlation values by subtracting parts from which a maximum amplitude part of the symbolically integrated theoretical correlation values is removed, from the symbolically integrated correlation values; and detecting a maximum part of an amplitude of correlation from which the pseudo correlation values are removed, and at time when detecting the maximum part, sending the spreading codes on the receiving side as synchronized spreading codes.

In addition, the above-described step of obtaining the symbolically integrated correlation values is characterized in that the step has theoretical correlation values of the receiving symbols of the receiving symbol sequence when receiving the known transmitting symbol sequence as the receiving symbol sequence, and includes steps of inversely modulating correlation values of the receiving symbols of the receiving symbol sequence with the theoretical correlation values, symbolically integrating inversely modulated correlation values for a predetermined number of symbols, and obtaining symbolically integrated correlation values.

Also, the objective of the above-described present invention is achieved by a receiving method in a spectrum spreading communication system for receiving a spectrum-spread signal as a receiving signal, which is created by applying spectrum-spreading with spreading codes on a transmitting side by means of direct spreading to an information signal including a known transmitting symbol sequence, the method including steps of:

previously obtaining and storing theoretical correlation values by taking account of the known transmitting symbol sequence and the spreading codes on the transmitting side;

inversely modulating the receiving signal with theoretical values of the known transmitting symbol sequence, and performing symbolic integration for a predetermined number of symbols;

correlating a symbolically integrated signal with spreading codes on a receiving side, and obtaining correlation values; and detecting synchronization timing from the correlation values and the theoretical correlation values, and at time when detecting the synchronization timing, sending the spreading codes on the receiving side as synchronized spreading codes.

According to the present invention, since it is possible to certainly establish the synchronization and improve the accuracy of detecting synchronization timing even in case that the correlation of phase shifts of the spreading codes is not zero, the characteristic of the RAKE combination is improved and receiving quality is improved.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Embodiments of the present invention will be explained by referring to Figures.

A receiving apparatus for spectrum spreading communication in accordance with an embodiment of the present invention receives a spectrum-spread signal as a receiving signal, which is created by applying spectrum-spreading with spreading codes on a transmitting side by means of direct spreading to an information signal including a known transmitting symbol sequence consisting of the known N (N is an integer equal to or more than two) number of transmitting symbols.

Here, the spreading codes on the transmitting side are orthogonal GOLD codes having sixteen codes for one period, and the spreading codes are:
[1 -1 -1 -1 -1 1 -1 1 -1 -1 1 1 -1 1 1 1]

Also, assuming that the known N number of transmitting symbols of the known transmitting symbol sequence is:
[1 1 -1 1 -1], the transmitting signal (spectrum-spread signal) is:
[1 -1 -1 -1 -1 1 -1 1 -1 -1 1 1 -1 1 1 1, 1 -1 -1 -1 -1 1 -1 1 -1 -1 1 1 1 -1 1 1 1, -1 1 1 1 1 -1 1 -1 1 1 -1 -1 1 -1 -1 -1, 1 -1 -1 -1 -1 1 -1 1 -1 -1 1 1 1 -1 1 1 1, -1 1 1 1 1 -1 1 -1 1 1 -1 -1 -1 1 -1 -1 1 -1 -1 1 -1 -1 -1].

Figure 1:
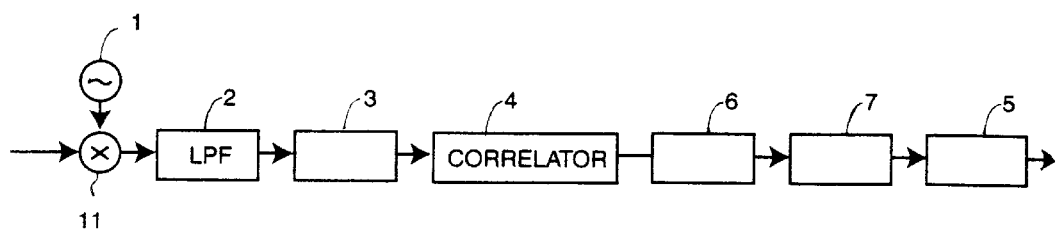
FIG. 1 is a block diagram of a synchronizing circuit used in a receiving apparatus for spectrum spreading communication in accordance with a first embodiment of the present invention.
Figure 8:
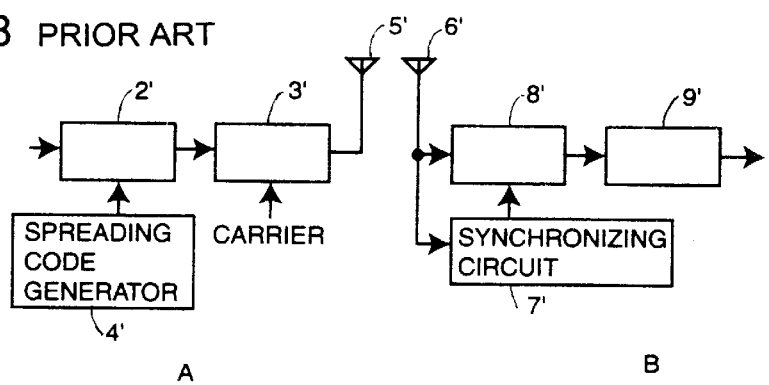
FIG. 8 is a block diagram of a transmitting apparatus for spectrum spreading communication and a receiving apparatus for spectrum spreading communication of a direct spreading-spectrum spreading communication system.

The receiving apparatus for spectrum spreading communication in accordance with this embodiment is similar to the receiving apparatus B for spectrum spreading communication in FIG. 8 other than the use of a synchronizing circuit shown in FIG. 1 in place of the synchronous circuit 7' of the receiving apparatus for spectrum spreading communication in FIG. 8.

The synchronizing circuit shown in FIG. 1 detects synchronization only using the known transmitting symbol sequence. And, a detecting range is assumed to be one chip interval for one symbol. This synchronizing circuit shown in FIG. 1 is similar to the synchronizing circuit in FIG. 9 except that the synchronizing circuit in FIG. 1 has a symbolic integration section 6 connected to a correlator 4, and a pseudo correlation removing section 7 connected to the symbolic integration section 6.

Figure 9:
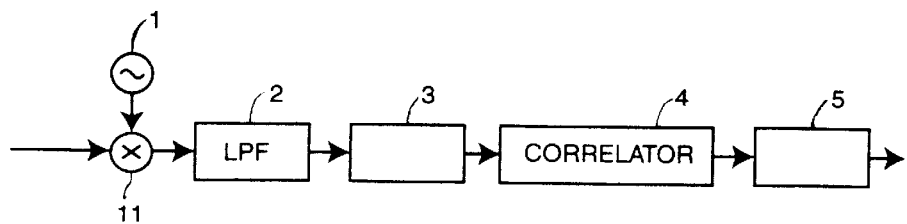
FIG. 9 is a block diagram of a conventional synchronizing circuit used as a synchronizing circuit of the receiving apparatus for spectrum spreading communication in FIG. 8.

In FIG. 1, like in the synchronizing circuit in FIG. 9, a receiving signal is processed to generate a base band signal (spectrum-spread signal) by a combination of a mixer 11, an LPF 2 and a sample hold circuit 3, and this spectrum-spread signal is sent to the correlator 4.

Figure 10:
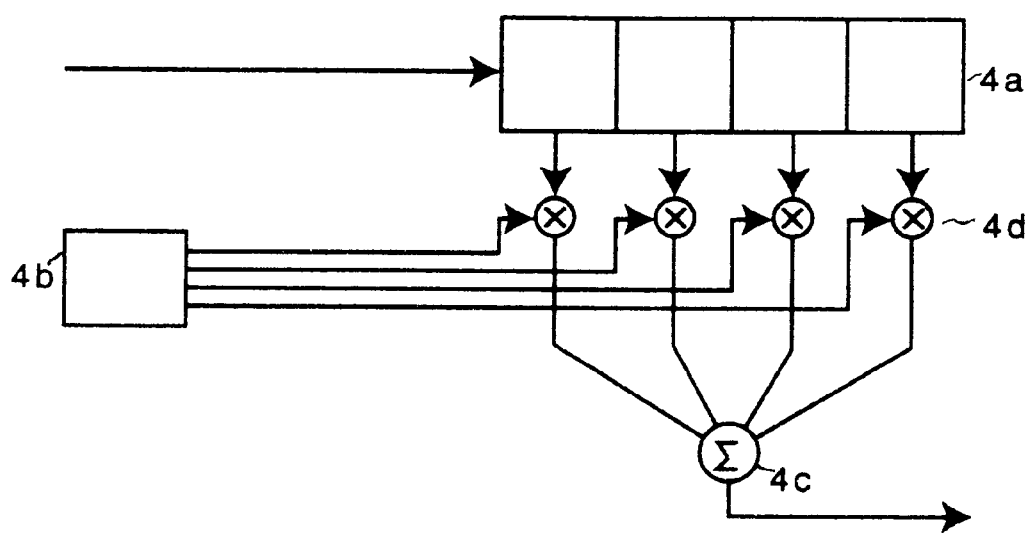
FIG. 10 is a block diagram of a correlator used in the synchronizing circuit in FIGS. 9, 1 and 7.

The correlator 4 is, like in the synchronizing circuit in FIG. 9, constructed of a matched filter shown in FIG. 10 and multiplies codes for one period of spreading codes on a transmitting side of a spectrum-spread signal by codes for one period of previously given spreading codes on a receiving side, and outputs the summations of results of the multiplication as a symbol signal. In this case, the correlator 4 performs the above-described multiplication chip by chip corresponding to the spreading codes on the receiving side for one period, and outputs the summations of the results of the multiplication chip by chip as the symbol signal.

The summations of the multiplication results represent correlation values of the N number of receiving symbols of a receiving symbol sequence, respectively. In this manner, the correlator 4 correlates the spectrum-spread signal with the transmitting codes on the receiving side, and outputs the correlation values of the N number of receiving symbols of the receiving symbol sequence.

In case that the receiving symbol sequence is the known transmitting symbol sequence, using theoretical values of the known transmitting symbol sequence, the symbolic integration section 6 inversely modulates the symbol signal inversely spread at one chip interval, and performs symbolic integration for a predetermined number of the symbols.

Also, in case that the spectrum-spread signal is created by applying spectrum-spreading with the spreading codes on the transmitting side by means of direct spreading to the information signal including only an unknown transmitting symbol sequence without including the known transmitting symbol sequence, using a determination value determined after demodulating the unknown transmitting symbol sequence received as a receiving symbol sequence, the symbolic integration section 6 inversely modulates the unknown transmitting symbol sequence, and performs symbolic integration for a predetermined number of the symbols.

Figure 2:
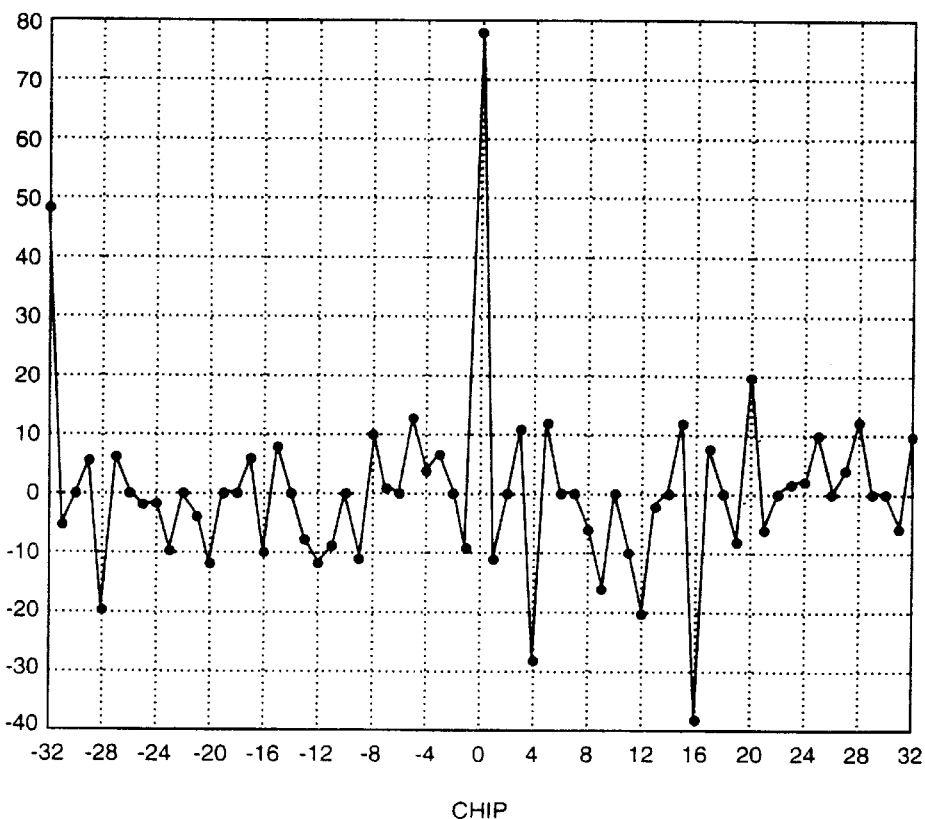
FIG. 2 is a diagram showing correlation values after passing through a correlator and a symbolic integration section of the synchronizing circuit in FIG. 1.

For example, in case that the symbol signal inversely spread at one chip interval is inversely modulated in the symbolic integration section 6 using the theoretical values of the known symbols, and is symbolically integrated for five symbols, resultant values are shown in FIG. 2.

The symbolic integration section 6 has theoretical correlation values of the receiving symbols of the receiving symbol sequence which are obtained by the correlator 4 when receiving the known transmitting symbol sequence as a receiving symbol sequence, and inversely modulates correlation values of the receiving symbols of the receiving symbol sequence using these theoretical correlation values. And, the symbolic integration section 6 symbolically integrates the inversely modulated correlation values for a predetermined number of symbols and outputs the symbolically integrated correlation values.

Figure 3:
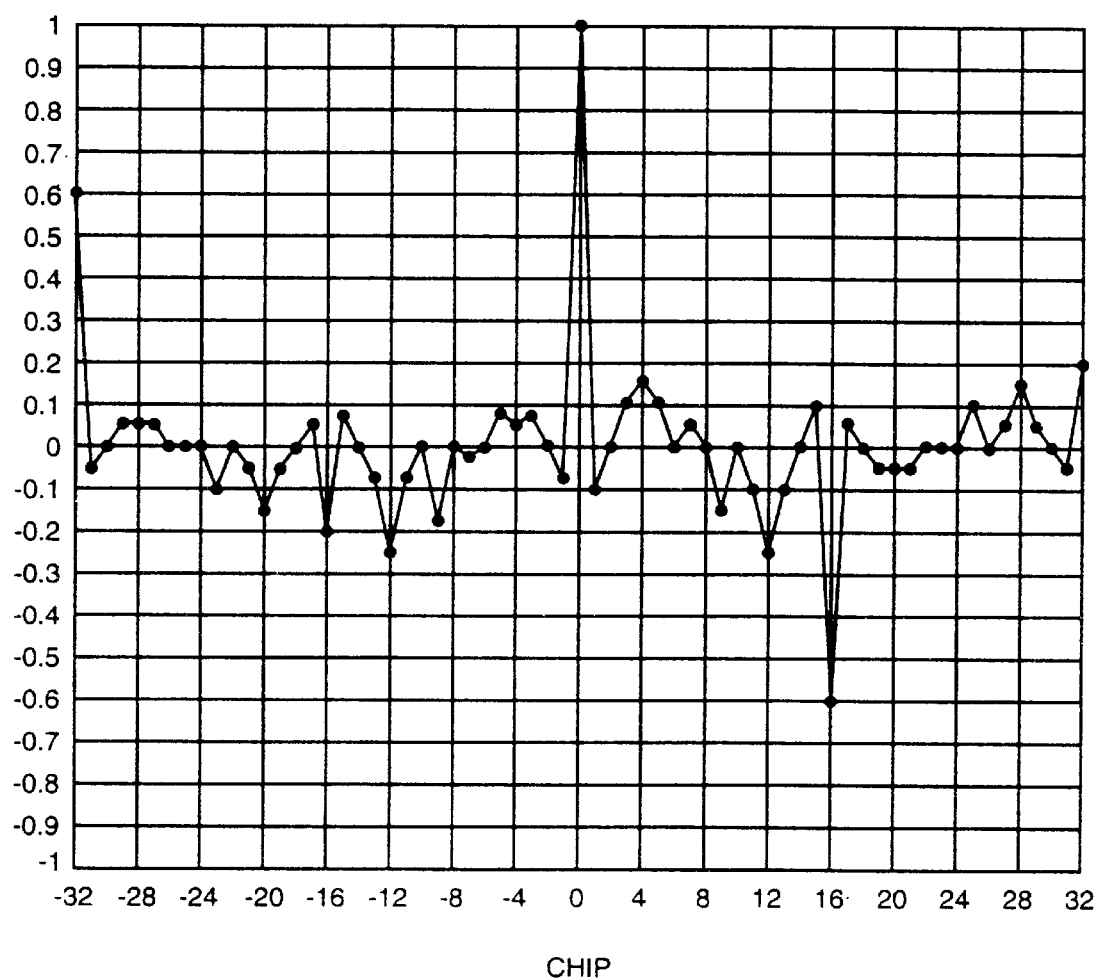
FIG. 3 is a diagram showing theoretical values of correlation values after passing through a correlator and a symbolic integration section of the synchronizing circuit in FIG. 1.

The pseudo correlation removing section 7 removes pseudo correlation from the integrated symbol signal. Particularly, in the pseudo correlation removing section 7, by taking account of the transmitting symbol sequence and the spreading codes on the transmitting side, correlation values when receiving the transmitting symbol sequence with shifts of n chips are previously obtained. FIG. 3 shows the correlation values when receiving the transmitting symbol sequence with shifts of n chips in taking account of the transmitting symbol sequence and the spreading codes on the transmitting side, and the maximum portion is normalized to be 1.0.

Since, if finding the maximum portion of a level in FIG. 2, the maximum portion is 78.0 at a chip 0, in order to remove pseudo correlation, the pseudo correlation removing section 7 subtracts the theoretical correlation values of FIG. 3 multiplied by 78.0 at chips other than the chip 0 from the correlation values of FIG. 2. The resultant values are shown in FIG. 4.

Figure 4:
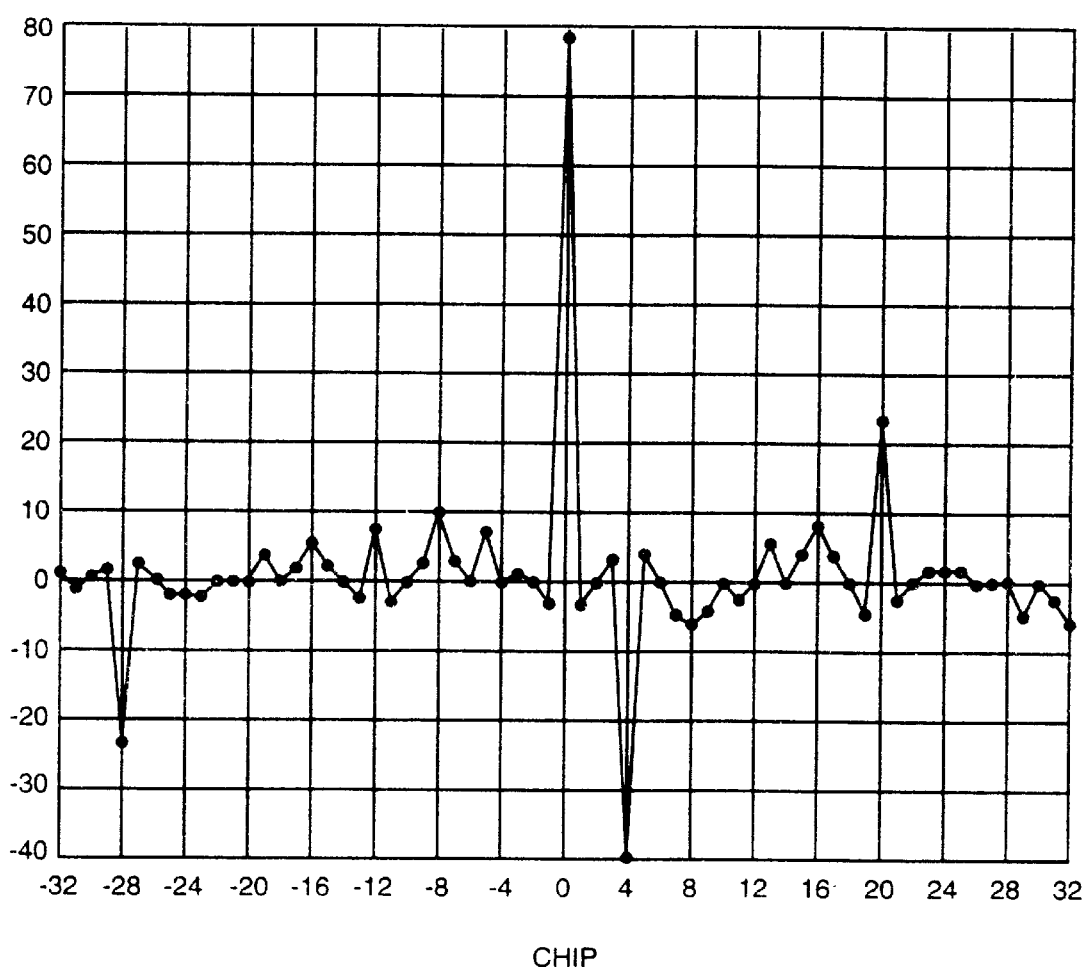
FIG. 4 is a diagram showing correlation values after removing pseudo correlation one time in a pseudo correlation removing circuit of the synchronizing circuit in FIG. 1.
Figure 5:
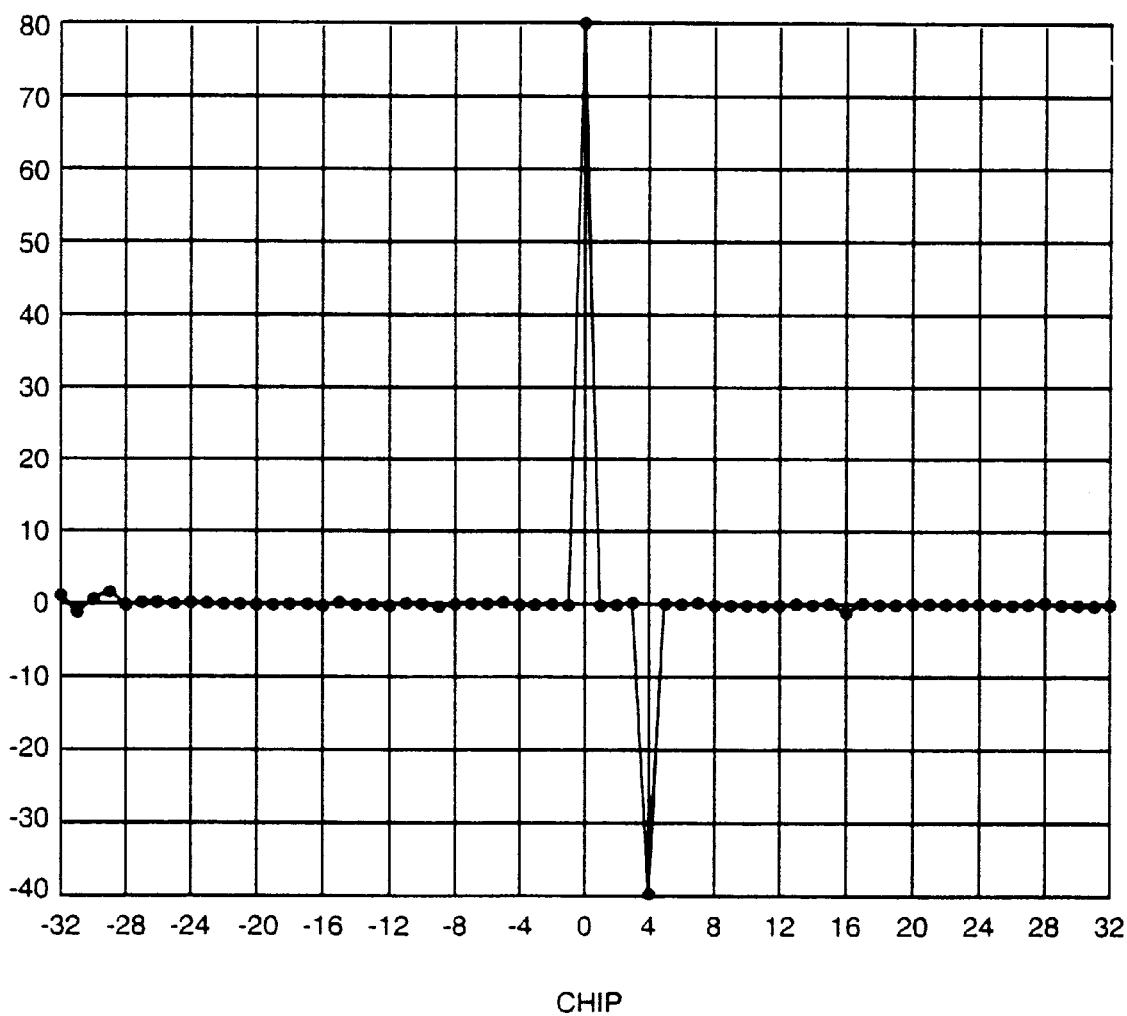
FIG. 5 is a diagram showing correlation values after removing pseudo correlation two times in the pseudo correlation removing circuit of the synchronizing circuit in FIG. 1.

Next, since, if finding the maximum portion in FIG. 4 in which this pseudo correlation is removed one time, the maximum portion is −39.7 at a chip 4, in order to remove pseudo correlation, the pseudo correlation removing section 7 subtracts the theoretical correlation values of FIG. 3 multiplied by −39.7 at chips other than the chip 4 from the correlation values of FIG. 4. The resultant values are shown in FIG. 5. This process is repeated predetermined times until the maximum level is below a certain absolute level or until the maximum level is below a certain level against a noise level.

In this manner, in case of using the known transmitting symbol sequence and the spreading codes on the transmitting side, the pseudo correlation removing section 7 previously obtains symbolically integrated theoretical correlation values output from the symbolic integration section 6, and pseudo correlation values are removed from the symbolically integrated correlation values by subtracting parts from which the maximum amplitude part of the symbolically integrated theoretical correlation values is removed, from the symbolically integrated correlation values that are actually output from the symbolic integration section 6.

In addition, in the pseudo correlation removing section 7, although influence of a transmitting and receiving filter is neglected, in case that the influence of the transmitting and receiving filter cannot be neglected, the symbolically integrated theoretical correlation values output from the symbolic integration section 6 can be previously obtained by using the known transmitting symbol sequence and the spreading codes on the transmitting side and by taking account of characteristic of the transmitting and receiving filter.

A synchronization detecting section 5 obtains power of signals output from the pseudo correlation removing section 7, from which the pseudo correlation has been removed, and selects some signals of which power is above a predetermined level or which have higher power and provides the spectrum inverse spreading section 8' (FIG. 8) with timing of the selection, and makes the spectrum inverse spreading section 8' perform the spectrum inverse spreading and RAKE combination in response to the timing. In this case, the timing of the chip 0 and chip 4 is provided.

In other words, the synchronization detecting section 5 detects the maximum part of the amplitude of an output signal output from the pseudo correlation removing section 7, and at time when detecting the maximum part, sends the spectrum inverse spreading section 8' the spreading codes on the receiving side as the above-described synchronized spreading codes.

Another pseudo correlation removing section may be used as the pseudo correlation removing section 7 in FIG. 1, which will be explained below.

Figure 6:
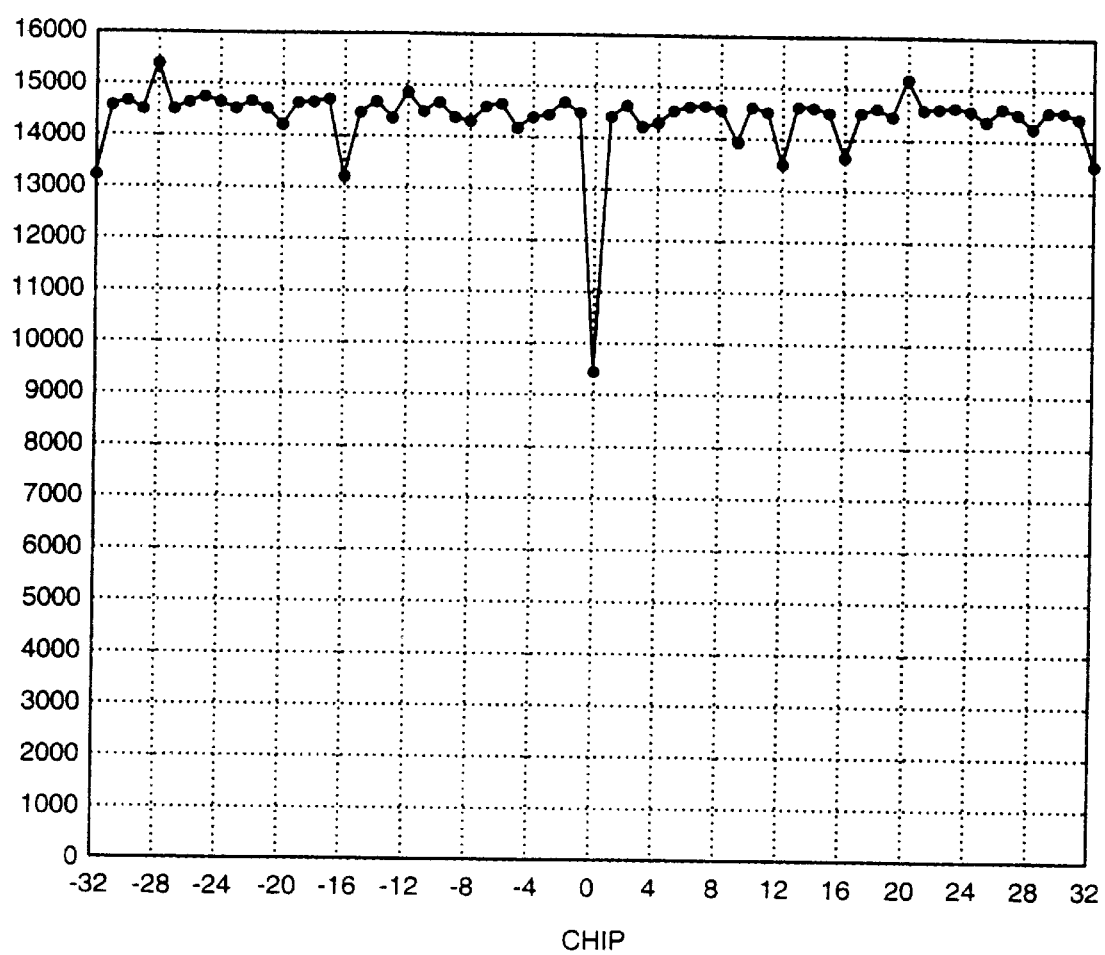
FIG. 6 is a diagram for explaining operation of another pseudo correlation removing circuit used in the synchronizing circuit in FIG. 1 and showing power after removing pseudo correlation in each chip.

In the pseudo correlation removing section, by taking account of the transmitting symbol sequence and the spreading codes on the transmitting side, correlation values when receiving the transmitting symbol sequence with shifts of n chips are previously obtained. FIG. 3 shows the correlation values when receiving the transmitting symbol sequence with shifts of n chips in taking account of the transmitting symbol sequence and the spreading codes on the transmitting side, and the maximum portion is normalized to be 1.0. The pseudo correlation removing section subtracts the theoretical correlation values of FIG. 3 multiplied by a level of a chip which is taken as reference in FIG. 2, from the correlation values of FIG. 2, and power of the resultant values is obtained. FIG. 6 is a result obtained by repeating this process from a chip −32 to a chip 32 chip by chip. As seen from FIG. 6, it is understood that it is the most efficient to remove the pseudo correlation by making a chip 0 to be the reference. Accordingly, in order to remove the pseudo correlation, the theoretical correlation values of FIG. 3 multiplied by 78.0 at chips other than the chip 0 are subtracted from the correlation values of FIG. 2. The resultant values are shown in FIG. 4.

Next, the pseudo correlation removing section conducts the same process for the correlation of FIG. 4, from which the pseudo correlation has been removed by making the chip 0 to be the reference. In other words, a chip 4 is the most efficient, and in order to remove the pseudo correlation, the theoretical correlation values of FIG. 3 multiplied by −39.7 at chips other than the chip 4 are subtracted from the correlation values of FIG. 4. The resultant values are shown in FIG. 5. This process is repeated until the maximum level is below a certain absolute level or until the maximum level is below a predetermined level against a noise level.

The receiving apparatus for spectrum spreading communication in accordance with the first embodiment of the present invention using the synchronizing circuit shown in FIG. 1 has been explained above.

Next, a second embodiment will be explained.

Figure 7:
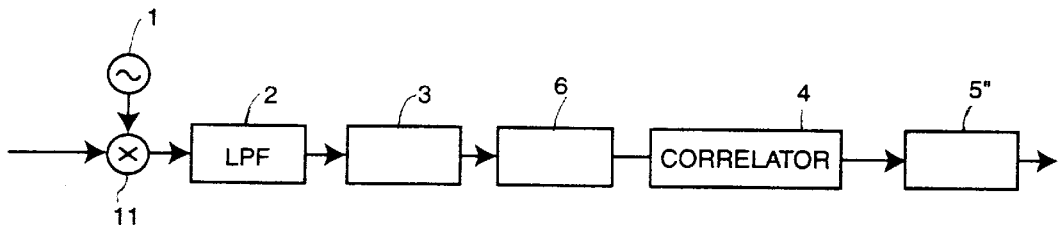
FIG. 7 is a block diagram of a synchronizing circuit used in a receiving apparatus for spectrum spreading communication in accordance with a second embodiment of the present invention.

In the second embodiment, a synchronizing circuit shown in FIG. 7 is used in place of using the synchronizing circuit shown in FIG. 1 in the receiving apparatus for spectrum spreading communication of the first embodiment. The synchronizing circuit shown in FIG. 7 will be explained below.

The synchronizing circuit shown in FIG. 7 also detects synchronization only using the known transmitting symbol sequence, and a detecting range is one chip interval for one symbol. The spreading codes on the transmitting side are, like in the above-mentioned case, orthogonal GOLD codes having sixteen codes for one period. With regard to an arrangement of the spreading codes of the transmitting side and the known N number of transmitting symbols of the known transmitting symbol sequence, the same arrangement as in the above-mentioned case is used.

The synchronizing circuit shown in FIG. 7 is similar to the synchronizing circuit shown in FIG. 1 except that a symbolic integration section 6 is connected to a sample hold circuit 3, a correlator 4 is connected to the symbolic integration section 6, and a synchronization detecting section 5" is connected to the correlator 4.

In FIG. 7, like in the synchronizing circuit in FIG. 1, a receiving signal is processed to generate a base band signal (spectrum-spread signal) by a combination of a mixer 11, an LPF 2 and the sample hold circuit 3, and this spectrum-spread signal is sent to the symbolic integration section 6.

The symbolic integration section 6 applies inverse-spreading to this spectrum-spread signal at one chip interval, inversely modulates the inversely spread symbol signal sixteen chips by sixteen chips using theoretical values of the known transmitting symbols, and performs symbolic integration for five symbols.

The correlator 4 is constructed of the matched filter shown in FIG. 10 and multiplies codes for one period of the spreading codes on the transmitting side of a signal output from the symbolic integration section 6 by codes for one period of previously given spreading codes on the receiving side, and outputs the summations of results of the multiplication. In this case also, the correlator 4 performs the above-described multiplication chip by chip corresponding to the spreading codes on the receiving side for one period, and outputs the summations of the results of the multiplication chip by chip. The summations of the multiplication results output from the correlator 4 are shown in FIG. 2.

The synchronization detecting section 5" detects receiving timing based on the integrated symbol signal from the correlator 4. Particularly, by taking account of the transmitting symbol sequence and the spreading codes on the transmitting side, the synchronization detecting section 5" previously obtains correlation values when receiving the transmitting symbol sequence with shifts of n chips. At this time, by taking account of the transmitting symbol sequence and the spreading codes on the transmitting side, the maximum portion of the correlation when receiving the transmitting symbol sequence with shifts of n chips is normalized to be 1.0, and correlation values c(n) when receiving the transmitting symbol sequence with shifts of n chips are previously obtained from a chip -64 to a chip 64 every one chip.

By placing correlation values a(n) of FIG. 3 from a chip -32 to a chip 32 every one chip and creating a matrix A=[a(-32) a(-31) a(-30) . . . a(32)], B=[b(-32) b(-31) b(-30) . . . b(32)] is obtained so as to be A=b(-32)×[c(-64) c(-63) c(-62) . . . c(0)]+b(-31)×[c(-63) c(-62) c(-61) . . . c(1)]+b(-30)×[c(-62) c(-61) c(-60) . . . c(2)] . . . +b(32)×[c(0) c(1) c(2) . . . c(64)].

In the case of this example, b(0)=80, b(4)=-40, b(n)=0 [n=-32, -31, . . . , -1, 1, 2, 3, 5, 6, . . . , 32] is obtained. And, the synchronization detecting section 5" provides the spectrum inverse spreading section 8' (FIG. 8) with a chip 0 and chip 4 as the receiving timing, and makes the spectrum inverse spreading section 8' perform the spectrum inverse spreading and RAKE combination in response to the timing.

In this manner, in order to obtain the correlation values of FIG. 2, the synchronizing circuit in FIG. 7 has an arrangement in which the correlator 4 and the symbolic integration section 6 in FIG. 1 are replace by each other, and has an arrangement in which a function of the pseudo correlation removing section 7 in FIG. 1 is incorporated into the synchronization detecting section 5".

The entire disclosure of Japanese Patent Application No. 9-114754 filed on May 2, 1997 including specification, claims, drawing and summary are incorporated herein by reference in its entirety.

What is claimed is:

1. A receiving apparatus for spectrum spreading communication for receiving a spectrum-spread signal as a receiving signal, which is created by applying spectrum-spreading with spreading codes on a transmitting side by means of direct spreading to an information signal including a known transmitting symbol sequence, said apparatus comprising:

a synchronizing circuit for synchronizing spreading codes on a receiving side same as said spreading codes on said transmitting side with said spreading codes on said transmitting side of said receiving signal to be synchronized spreading codes;

a spectrum inverse spreading section for applying spectrum-inverse-spreading to said receiving signal with said synchronized spreading codes and outputting a spectrum-inverse-spread signal; and a demodulating section for demodulating said information signal from said spectrum-inverse-spread signal, said synchronizing circuit having:

a correlator for correlating said receiving signal with said spreading codes on said receiving side and outputting correlation values of a receiving symbol sequence;

a symbolic integration section for inversely modulating correlation values of said receiving symbol sequence with theoretical values of said known transmitting symbol sequence, performing symbolic integration for a predetermined number of symbols, and outputting symbolically integrated correlation values;

a pseudo correlation removing section in which symbolically integrated theoretical correlation values are previously obtained by taking account of said known transmitting symbol sequence and said spreading codes on said transmitting side, for removing pseudo correlation values from said symbolically integrated correlation values by subtracting parts from which a maximum amplitude part of said symbolically integrated theoretical correlation values is removed, from said symbolically integrated correlation values; and a synchronization detecting section for detecting a maximum part of an amplitude of an output signal output from said pseudo correlation removing section, and at time when detecting said maximum part, sending said spectrum inverse spreading section said spreading codes on said receiving side as said synchronized spreading codes.

2. A receiving apparatus for spectrum spreading communication for receiving a spectrum-spread signal as a receiving signal, which is created by applying spectrum-spreading with spreading codes on a transmitting side by means of direct spreading to an information signal including a known transmitting symbol sequence consisting of a known N (N being an integer equal to or more than two) number of transmitting symbols, said apparatus comprising:

a synchronizing circuit for synchronizing spreading codes on a receiving side same as said spreading codes on said transmitting side with said spreading codes on said transmitting side of said receiving signal to be synchronized spreading codes;

a spectrum inverse spreading section for applying spectrum-inverse-spreading to said receiving signal with said synchronized spreading codes and outputting a spectrum-inverse-spread signal; and a demodulating section for demodulating said information signal from said spectrum-inverse-spread signal, said synchronizing circuit having:

a correlator for correlating said receiving signal with said spreading codes on said receiving side and outputting correlation values of an N number of receiving symbols of a receiving symbol sequence;

a symbolic integration section for symbolically integrating said correlation values of said receiving symbols of said receiving symbol sequence for a predetermined number of symbols, and outputting symbolically integrated correlation values;

a pseudo correlation removing section in which, in case of using said known transmitting symbol sequence and said spreading codes on said transmitting side, symbolically integrated theoretical correlation values output from said symbolic integration section are previously obtained, for removing pseudo correlation values from said symbolically integrated correlation values by subtracting parts from which a maximum amplitude part of said symbolically integrated theoretical correlation values is removed, from said symbolically integrated correlation values; and a synchronization detecting section for detecting a maximum part of an amplitude of an output signal output from said pseudo correlation removing section, and at time when detecting said maximum part, sending said spectrum inverse spreading section said spreading codes on said receiving side as said synchronized spreading codes.

3. A receiving apparatus for spectrum spreading communication according to claim 2, wherein said symbolic integration section has theoretical correlation values of said receiving symbols of said receiving symbol sequence which are obtained by said correlator when receiving said known transmitting symbol sequence as said receiving symbol sequence, and inversely modulates correlation values of said receiving symbols of said receiving symbol sequence with said theoretical correlation values, symbolically integrates inversely modulated correlation values for a predetermined number of symbols, and outputs symbolically integrated correlation values.

4. A receiving apparatus for spectrum spreading communication for receiving a spectrum-spread signal as a receiving signal, which is created by applying spectrum-spreading with spreading codes on a transmitting side by means of direct spreading to an information signal including a known transmitting symbol sequence, said apparatus comprising:

a synchronizing circuit for synchronizing spreading codes on a receiving side same as said spreading codes on said transmitting side with said spreading codes on said transmitting side of said receiving signal to be synchronized spreading codes;

a spectrum inverse spreading section for applying spectrum-inverse-spreading to said receiving signal with said synchronized spreading codes and outputting a spectrum-inverse-spread signal; and a demodulating section for demodulating said information signal from said spectrum-inverse-spread signal, said synchronizing circuit having:

a symbolic integration section for inversely modulating said receiving signal with theoretical values of said known transmitting symbol sequence, and performing symbolic integration for a predetermined number of symbols;

a correlator for correlating an output signal from said symbolic integration section with said spreading codes on said receiving side and outputting correlation values; and a synchronization detecting section in which theoretical correlation values are previously obtained by taking account of said known transmitting symbol sequence and said spreading codes on said transmitting side, for detecting synchronization timing from correlation values output from said correlator and said theoretical correlation values, and at time when detecting said synchronization timing, sending said spectrum inverse spreading section said spreading codes on said receiving side as said synchronized spreading codes.

5. A receiving method in a spectrum spreading communication system for receiving a spectrum-spread signal as a receiving signal, which is created by applying spectrum-spreading with spreading codes on a transmitting side by means of direct spreading to an information signal including a known transmitting symbol sequence, said method comprising steps of:

previously obtaining and storing symbolically integrated theoretical correlation values by taking account of said known transmitting symbol sequence and said spreading codes on said transmitting side;

correlating said receiving signal with spreading codes on a receiving side, and obtaining correlation values of a receiving symbol sequence;

inversely modulating correlation values of said receiving symbol sequence with theoretical values of said known transmitting symbol sequence, performing symbolic integration for a predetermined number of symbols, and obtaining symbolically integrated correlation values;

removing pseudo correlation values from said symbolically integrated correlation values by subtracting parts from which a maximum amplitude part of said symbolically integrated theoretical correlation values is removed, from said symbolically integrated correlation values; and detecting a maximum part of an amplitude of correlation from which said pseudo correlation values are removed, and at time when detecting said maximum part, sending said spreading codes on said receiving side as synchronized spreading codes.

6. A receiving method in a spectrum spreading communication system for receiving a spectrum-spread signal as a receiving signal, which is created by applying spectrum-spreading with spreading codes on a transmitting side by means of direct spreading to an information signal including a known transmitting symbol sequence consisting of a known N (N being an integer equal to or more than two) number of transmitting symbols, said method comprising steps of:

previously obtaining and storing symbolically integrated theoretical correlation values in case of using said known transmitting symbol sequence and said spreading codes on said transmitting side;

correlating said receiving signal with spreading codes on a receiving side, and obtaining correlation values of an N number of receiving symbols of a receiving symbol sequence;

symbolically integrating said correlation values of said receiving symbols of said receiving symbol sequence for a predetermined number of symbols, and obtaining symbolically integrated correlation values;

removing pseudo correlation values from said symbolically integrated correlation values by subtracting parts from which a maximum amplitude part of said symbolically integrated theoretical correlation values is removed, from said symbolically integrated correlation values; and detecting a maximum part of an amplitude of correlation from which said pseudo correlation values are removed, and at time when detecting said maximum part, sending said spreading codes on said receiving side as synchronized spreading codes.

7. A receiving method in a spectrum spreading communication system according to claim 6, wherein said step of obtaining said symbolically integrated correlation values has theoretical correlation values of said receiving symbols of said receiving symbol sequence when receiving said known transmitting symbol sequence as said receiving symbol sequence, and includes steps of inversely modulating correlation values of said receiving symbols of said receiving symbol sequence with said theoretical correlation values, symbolically integrating inversely modulated correlation values for a predetermined number of symbols, and obtaining symbolically integrated correlation values.

8. A receiving method in a spectrum spreading communication system for receiving a spectrum-spread signal as a receiving signal, which is created by applying spectrum-spreading with spreading codes on a transmitting side by means of direct spreading to an information signal including a known transmitting symbol sequence, said method comprising steps of:

previously obtaining and storing theoretical correlation values by taking account of said known transmitting symbol sequence and said spreading codes on said transmitting side;

inversely modulating said receiving signal with theoretical values of said known transmitting symbol sequence, and performing symbolic integration for a predetermined number of symbols;

correlating a symbolically integrated signal with spreading codes on a receiving side, and obtaining correlation values; and detecting synchronization timing from said correlation values and said theoretical correlation values, and at time when detecting said synchronization timing, sending said spreading codes on said receiving side as synchronized spreading codes.

* * * * *